Patented June 25, 1940

2,205,416

UNITED STATES PATENT OFFICE

2,205,416

COLORING WITH AZO DYES

Jean G. Kern, Buffalo, N. Y., assignor to National Aniline & Chemical Company, Inc., New York, N. Y., a corporation of New York No Drawing. Application January 21, 1939, Serial No. 252,217

18 Claims. (Cl. 8—46)

This invention relates to the art of coloring with azo dyes and to new compositions and dyeing processes useful in connection therewith. It relates more particularly to improvements in compositions and processes for the dyeing and printing of textile fibers with insoluble azo dyes which are prepared by a coupling reaction of azo dye-forming intermediates in the presence of the fiber.

The insoluble azo dyes represent a valuable class of coloring agents for textile fibers and other materials. Owing to their insolubility they are generally prepared in the presence of the fiber, substrate or other materials; for example, by impregnating the fiber with one of the intermediates and then coupling said intermediate with the other required intermediate; or by applying a mixture of the intermediates in a stabilized form to the fiber, as by printing, padding, or the like, and then subjecting the treated fiber to a process adapted to effect the coupling.

For use in the dyeing and printing of textile fibers by such methods, various azo dye-forming intermediates are employed, such as, various naphthols and naphtholates (and especially the arylides of 2,3-hydroxy-naphthoic acid); arylpyrazolone derivatives; arylides of aceto-acetic and other acylaceto carboxylic acids; arylides of mono-nuclear ortho hydroxy-carboxylic acids, and of 2,3-hydroxy-carboxylic acid derivatives of anthracene, anthraquinone, carbazole, and the like; 2,4-dihydroxy-quinolines, etc., which are designated generically as developers; and various stabilized forms of diazotized aromatic amines, such as, metal salts of aromatic nitrosamines (or diazotates); aromatic diazoamino (and imino) compounds; stable diazo salts of aromatic amines, etc.

The azo-dye-forming intermediates usually come into the market in the form of powders, pastes or solutions containing the individual components or mixtures thereof.

Thus, the arylides come into the market in the form of the free hydroxy compounds or equivalents (e. g., the free arylide of 2,3-naphthoic acid, or the free arylide of aceto-acetic acid), generally in the form of a dry solid, but they are used in alkaline solution for coupling with the diazo component. The said arylides are insoluble in water and notoriously difficult to wet or disperse in aqueous solutions; and owing to these properties it is difficult to prepare from them usable aqueous solutions of their alkali-metal salts. Heretofore, to overcome these difficulties, it has been proposed to mix the arylide with gums or soaps to form dry compositions which, when added to an aqueous medium, disintegrate to release the arylide in close contact with an aqueous solution of the gum or soap formed in situ, and thereby to cause dispersion of the arylide through the aqueous mass to which caustic alkali is added before or after entry in the said mass of the arylide. Another proposed method consists of making a smooth paste of the arylide with a water-soluble organic solvent (such as, alcohol or acetone) or with a sulfonated oil (such as, Turkey red oil or monopole brilliant oil), and adding the resulting paste to the aqueous alkali. In most instances further additions of Turkey red oil are found necessary to assist in dispersing and helping the arylide to dissolve in the aqueous alkali to an extent such that the resulting solutions are usable for dyeing and printing purposes. Such treatments lead, however, to unsatisfactory results: thus, the presence of foaming agents, such as gums and soaps, in amount to effect dispersion of the arylides, causes the solutions and dispersions thereof to foam and thereby to become unfit for use in dyeing and printing processes; the use of Turkey red oil leads to difficulties with insoluble calcium and magnesium salts of the oil, which form in hard water, and to objectionable sticky viscous mixtures which are messy and troublesome to handle and the use of water-soluble organic solvents is costly and frequently involves inconveniences such as fire-hazards. Further, the presence in the resulting solutions or dispersions of such substances as gums, soaps and Turkey red oil, in large amounts in relation to the arylide, tends to diminish the substantive qualities of the arylides.

Mixed products particularly adapted for use in printing come into the market is mixtures of the arylides or other developers with stabilized forms of diazotized aromatic amines. They are exemplified by the mixtures of developers and metal salts of aromatic nitrosamines known as "Rapid Fast" colors, and the mixtures of the developers and amine-stabilized diazotized aromatic amines known as "Rapidogens." Such compositions, when in the form of powders, also are subject to the above difficulties.

An object of the present invention is to provide a composition for the production of insoluble azo dyes whereby improved dyeings and prints are obtained.

Another object of the invention is to provide a class of assistants for the production of dyeings and prints with insoluble azo dyes or textile fibers, whereby improvements in the dyeing and printing are secured without introducing components which interfere with the coupling action.

A further object of the invention is to provide improvements in the dyeing and printing of textile fibers with azo dyes derived from arylides of 2,3-hydroxy-naphthoic acid and stabilized diazo compounds of the nitrosamine and diazoamino and diazoimino types, whereby improved penetration of the fiber is secured.

An additional object of the invention is to provide improved dry compositions containing developers for the formation of azo dyes, whereby said compositions disperse readily when added to water or to aqueous liquids.

Other objects of the invention will in part be obvious and will in part appear hereinafter.

According to the present invention, the salts of certain acid alkyl esters of polybasic inorganic acids, hereinafter more fully described, are employed as additions to the azo-dye-forming intermediates and as assistants in the dyeing and printing of textile fibers with insoluble azo dyes formed from azo-dye-forming intermediates. It has been found in accordance with the present invention that the soluble salts of the hereindescribed acid alkyl esters of polybasic inorganic acids possess a combination of properties which render them of especial value for the production and manufacture of the azo-dye-forming intermediates in the solid form, and especially in the form of powders, and for use as assistants in the dyeing of textile fibers by means of said intermediates. Thus, the soluble salts of the hereindescribed acid alkyl esters of inorganic polybasic acids, and especially of sulfuric acid, have the faculty of rapidly entering into solution in water and other aqueous suspension media usually employed in producing the azo dyes and causing particles of the intermediates associated therewith to disintegrate readily, whereby they are enabled to disperse and/or dissolve rapidly. Further, by their presence during the impregnation of the fiber with the intermediates and/or during the coupling between the diazo compound and the developer, they exert a highly desirable beneficial action and a favorable influence on the fiber, resulting in a better penetration of the fiber, greater fastness to crocking and washing of the resulting dyeings and prints, and, in the case of prints, sharper outlines.

The invention accordingly comprises the compositions having the properties, ingredients and proportions of ingredients exemplified in the compositions hereinafter disclosed, and the processes comprising the steps and their relation exemplified in the processes hereinafter disclosed. The scope of the invention will be indicated in the appended patent claims.

In the practice of the present invention, the alkyl ester salts may be incorporated into the compositions prior to, subsequent to, or in conjunction with the preparation of the latter for use in preparing the azo dyestuffs. For example, they may be ground in the dry form with the developer or with the stabilized diazo compound or with a mixture of the developer and stabilized diazo compound, all in the dry form; or they may be incorporated into solutions and mixtures of any of said components and the resulting solutions and mixtures may be employed as such or reduced to the dry form.

Developers for azo dyes, as for example, the arylides of 2,3-hydroxy-naphthoic acid and of aceto-acetic acid (such as, the alkali metal salts of the anilide, o-toluidide, the beta-naphthylide, meta-nitranilide, p,p'-benzidide, p,p'-tolidide, p,p'-dianisidide, etc., of 2,3-hydroxy-naphthoic acid) or any of the other developers herein referred to may be converted into readily dispersible and/or readily soluble powders or pastes with the aid of said alkyl ester salts. A feature of the present invention is the production of developers in the solid form, and particularly in the dry solid form, adapted to disintegrate, wet out and disperse rapidly in cold and warm water to form aqueous pastes which dissolve readily upon addition of caustic alkali. It is especially of advantage in connection with the preparation of such compositions in which the developer is a carboxylic acid arylide, and more particularly an arylide or an aromatic hydroxy-carboxylic acid. Thus, the salt of an arylide of 2,3-hydroxy-naphthoic acid, as for example the sodium salt, may be dissolved in water, alcohol, or any other suitable solvent, with the aid of heat, the alkyl ester salt may be dissolved in the resulting solution, and the mixture then may be brought to dryness, ground, and screened. A very readily dispersible powder of the arylide salt is thus obtained.

Compositions may also be obtained in accordance with the present invention which comprise mixtures of said developers with suitable stabilized forms of diazo compounds; as for example, so-called nitrosamine salts; amine-stabilized compounds, such as diazoamino and diazoimino compounds, which may be represented by the following formula:

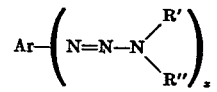

in which

Ar represents a nucleus or residue of the benzene, naphthalene, anthracene or carbazole series which is free from a solubilizing group (such as a carboxyl group, a sulfo group, etc.) but which may contain other substituents;

R' represents an alkyl, cyclo-alkyl, aralkyl or aryl hydrocarbon radical, which may be further substituted (as for example, by one of the groups: —OH, —SH, —COOH, —SO$_3$H, —OSO$_2$H, —OSO$_3$H, —SO$_2$NH—, —CH$_2$OSO$_2$H, etc.);

R'' represents hydrogen or a substituted or unsubstituted hydrocarbon radical of the type represented by R', and which may be the same as R' or different therefrom; and $x$ represents 1, 2 or 3.

Thus, mixtures of the stabilized forms of diazo compounds with the said developers may be prepared by mixing in the dry state the stabilized form of diazo compound with the readily dispersible powder of the developer, as for example the powder herein described, with or without the addition of a suitable diluent or filler and/or other ingredients desired in the final mixed product. Said mixtures are preferably prepared, however, by bringing to dryness a suspension or solution of a mixture of the developer, the stabilized form of diazo compound and the alkyl ester salt, with or without the aid of a vacuum drier. For example, the sodium salt of the anilide, or any other arylide, of 2,3-hydroxy-naphthoic acid may be dissolved in ethyl alcohol or other suitable organic solvent, the alkyl ester salt may be added, then a diazoamino compound or other stabilized form of diazo compund may be added, and the resulting mixture may be evaporated to dryness, ground and screened. The order of adding the developer, stabilized form of diazo compound, and alkyl ester salt may be varied.

The presence of the salts of the acid alkyl esters during the coupling of the dye-forming intermediates may be secured in any convenient or desirable manner. Thus, the salt of the acid alkyl ester may be incorporated with any of the intermediates employed for the formation of the azo dye (for example, they may be incorporated with the developer or they may be incorporated with the stabilized diazo compounds of the nitrosamine, diazoamino and diazoimino type); they may be incorporated with the thickeners or other materials added to the dye bath or printing paste; or they may be applied to the fiber prior to the dyeing or printing process. When the salts of the acid alkyl esters are incorporated with the stabilized diazo compound, it is desirable that the latter be of a neutral or alkaline character. When the salts of the acid alkyl esters are employed with acid-reacting diazo compounds, such as the diazonium chloride-zinc chloride double salts, it is preferable to previously impregnate the fiber with the alkyl ester salt or incorporate the alkyl ester salt with the developer, owing to the lower stability of the alkyl ester salts in acid media.

The alkyl ester salts are advantageously employed as components of dye-forming compositions containing a mixture of the developer and the stabilized diazo compound.

The soluble salts of the acid alkyl esters which may be employed in accordance with the present invention include all soluble salts of certain acid alkyl esters of inorganic polybasic acids, namely, the non-foaming acid alkyl esters which consist, on the one hand, of a radical of an inorganic polybasic acid in which at least one of the replaceable hydrogen atoms is present, and, on the other hand, of one or more organic radicals directly linked to the inorganic radical, said organic radicals being free from open-chain hydrocarbon radicals containing more than 8 carbon atoms. (As employed herein the term "non-foaming acid alkyl ester" denotes an ester which in the form of its sodium salt has little tendency to cause its aqueous solutions to foam or lather.) Thus, said salts include all soluble salts of partial esters of polybasic inorganic acids, more particularly those of sulfuric, boric, phosphoric and thiophosphoric acids, and especially those of sulfuric and phosphoric acids, containing at least one organic (ester) radical which is an alicyclic radical (cyclo-aliphatic hydrocarbon radical, which may be saturated or unsaturated and which may contain substituents) or is an open-chain hydrocarbon radical (saturated or unsaturated) which contains not more than 8 carbon atoms in the hydrocarbon radical, and not more than 5 carbon atoms if the carbon atoms are in a straight carbon chain and the radical is an unsubstituted primary radical, but which radical may contain one or more inorganic substituents (as for example, a hydroxyl group, an amino group, an imino group, a sulfo group, a sulfate group, a phosphate group, a borate group, etc.) and/or one or more organic substituents of the alicyclic or aromatic series (whether carbocyclic or heterocyclic) and/or one or more lower open-chain aliphatic, alicyclic or aromatic substituents (which may be further substituted by inorganic and/or organic substituents) linked to said open-chain hydrocarbon radical by an inorganic atom (as for example, oxygen, sulfur, nitrogen, etc.). If the organic (ester) radical is an open-chain hydrocarbon radical which contains 6, 7 or 8 carbon atoms in a straight carbon chain and the radical is an unsubstituted primary radical, the esters impart undesirable foaming and deterging properties to the compositions.

These partial esters (which are herein designated as "acid alkyl esters") may be represented by the formula $$(RO)_x{-}A{-}(ZH)_{n-x}$$

in which

R represents an alicyclic hydrocarbon radical or an open-chain hydrocarbon radical which contains not more than 8 carbon atoms, and not more than 5 carbon atoms if the carbon atoms are in a straight carbon chain and the radical is an unsubstituted primary radical, which radical may contain a substituent other than an aliphatic hydrocarbon radical, Z represents an oxygen or a sulfur atom, A represents the residue of the inorganic acid (as for example, the radical $SO_2$, the radical PO, the radical PS, B, etc.), $n$ represents the number of hydrogen atoms which are replaceable by a metal (herein designated as "replaceable hydrogen atoms") that are present in the uncombined polybasic acid from which the ester is derivable, and $x$ is one or more but not greater than $n-1$. As is well known a partial ester (acid alkyl ester) of a polybasic inorganic acid is an ester in which at least one of the replaceable hydrogen atoms of the parent polybasic inorganic acid has not been replaced by an organic radical.

It is to be noted, in the case of acid alkyl esters of polybasic acids containing 3 or more replaceable hydrogen atoms in which more than one of said hydrogen atoms have been replaced by organic radicals, the said organic radicals (represented by R in the above formula) may be the same or different.

Any suitable metal or base, including the organic bases, may be combined with the said acid alkyl esters to form the acid alkyl ester salts employed in accordance with the present invention, provided the resulting salts possess good solubility and also preferably a finely crystalline or amorphous form in the solid state. For example, alkali metal, alkali earth metal, zinc, magnesium, ammonium, etc. salts may be employed. Further, organic bases such as urea, guanidine, certain alkylamines (particularly the hydroxyalkyl amines), pyridine, etc., may be employed to form salts (as for example, quaternary ammonium salts) of said acid alkyl esters.

The alkyl ester salts employed in accordance with the present invention may be prepared in any manner well known to the art; as for example by the treatment of the corresponding monohydric or polyhydric alcohol, hydroxyalkyl ether, hydroxyalkyl amine, etc., in the presence or absence of a solvent or diluent, with a suitable inorganic reagent (such as phosphorus chloride or oxychloride, concentrated sulfuric acid and/or chlorsulfonic acid, etc.), and neutralization of the resulting acid alkyl ester with an inorganic or organic base which forms a readily soluble salt with said acid alkyl ester. It may be noted that the monoalkyl sulfuric acids resulting from the use of sulfuric acid may contain varying amounts of sulfonic acids which are sometimes produced due to secondary reactions; the presence of such sulfonic acids, however, does not impair the usefulness of the monoalkyl sulfuric acids in accordance with the present invention.

As illustrating various types of acid alkyl esters, the soluble salts of which may be employed in accordance with the present invention, the following may be mentioned:

Derivatives of alicyclic alcohols; as for example, the acid alkyl esters which may be derived on the one hand from such acids as sulfuric, boric and phosphoric acids and on the other hand from such alcohols as cyclohexyl alcohol, dihydroxy cyclohexane, ethyl cyclohexyl alcohol, cyclopentyl alcohol, methyl cyclopentyl alcohol, 2-amino cyclohexanol, piperidine beta-carbinol, pyrrolidine alpha-carbinol, etc.

Derivatives of open-chain monohydric straight-chain primary aliphatic alcohols which contain not more than 5 carbon atoms and which are free from substituents in the alkyl group; as for example, the monoethyl, propyl, butyl and amyl sulfuric acids, the mono- and di-ethyl, propyl, butyl and amyl phosphoric and boric acids, diamyl dithiophosphoric acids, etc.

Derivatives of open-chain monohydric aliphatic secondary, tertiary, and branched-chain primary alcohols, all of which contain 6 to 8 carbon atoms and which are free from substituents in the alkyl group; for example, the acid sulfates, acid phosphates, acid boro-sulfates, acid boro-phosphates of secondary and tertiary hexanols, secondary and tertiary heptanols, secondary and tertiary octanols, 2-methyl-pentanol, iso-amyl carbinol, dipropyl carbinol, 2,5-dimethyl-hexanol, etc.; such as, secondary hexyl sulfuric acid and phosphoric acid, 2,5-dimethyl-hexanol (3) sulfuric acid, methyl-hexyl-carbinol sulfuric acid, ethyl-isopropyl-carbinol phosphoric acid, di-isopropyl-carbinol phosphoric acid, isoamyl-carbinol sulfuric acid, etc.

Derivatives of open-chain aliphatic polyhydric alcohols which contain not more than 8 carbon atoms; as for example, the monoglycol and monoglycerin sulfuric, boric and phosphoric acids, the diglycol and diglycerin monophosphoric acids, the glycol and glycerin disulfuric, diphosphoric and triphosphoric acids, diglycerin boric acid, hexamethylene glycol-1,6-disulfuric acid, etc.

Derivatives of alkyl, aralkyl and aryl ethers of open-chain aliphatic polyhydric alcohols in which the alkyl group linked to the inorganic polybasic acid contains not more than 8 carbon atoms, and obtainable for example, by sulfonation or phosphation of said ethers; as for example, alkyl ethers of glycol and glycerin sulfuric and phosphoric acids (such as, the monoethyl ether of glycol sulfuric acid:

$$CH_3CH_2OCH_2CH_2OSO_3H,$$

the mono-isopropyl ether of glycol sulfuric acid, the monobutyl ether of glycol sulfuric acid, alpha-monoisoamyl ether of glycerin sulfuric acid, diethylene glycol disulfuric acid:

$$HO_3SOCH_2CH_2OCH_2CH_2OSO_3H),$$

alkyl ethers of polyglycol and polyglycerin sulfuric, boric and phosphoric acids (such as the monomethyl, monoethyl, etc. ethers of diethylene glycol sulfuric acid:

$$AlkOCH_2CH_2OCH_2CH_2OSO_3H,$$

wherein Alk represents methyl, ethyl, etc. radicals which may contain substituents, as for example, halogen atoms or hydroxyl, sulfo or carboxyl groups, etc.), aryl ethers of glycol and glycerin sulfuric, boric and phosphoric acids (such as, the 2-nitro-4-methyl-phenyl ether of glycol sulfuric acid:

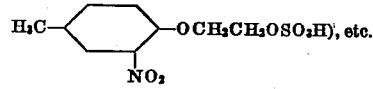

Derivatives of hydroxyalkyl amines of various kinds in which the alkyl group linked to the inorganic polybasic acid contains not more than 8 carbon atoms; for example, amino alkyl sulfuric acids which are included within the formulas:

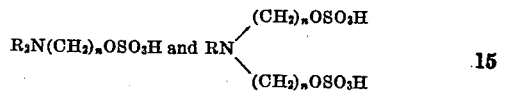

wherein R represents a hydrogen atom or the same or different alkyl groups or substituted alkyl groups or aryl groups or substituted aryl groups, and $n$ is from 2 to 8 (such as, amino ethyl sulfuric acid: $H_2NCH_2CH_2OSO_3H$, N-mono-normal-butyl amino ethyl sulfuric acid:

$$CH_3CH_2CH_2CH_2NHCH_2CH_2OSO_3H,$$

the acid sulfuric ester of N-di(hydroxyethyl)-2-ethyl-cyclohexylamine, the sulfuric ester of N-mono-hydroxy-ethyl-2-ethyl-cyclohexylamine, the sulfuric ester of N-mono-hydroxyethyl cyclohexylamine, the sulfuric ester of N-di(hydroxyethyl)cyclohexylamine, the sulfuric ester of N-hydroxyethyl tetrahydronaphthylamine, the sulfuric ester of N-hydroxyisopropyl normal-butylamine, the sulfuric ester of N-hydroxyisopropyl normal-butylamine, the sulfuric ester of the mono-hydroxyethyl ether of N-hydroxyethyl di-normal-butyl-amine:

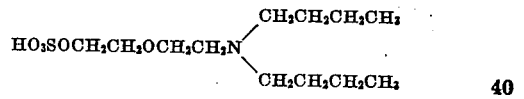

etc.) or their corresponding phosphoric or boric acid derivatives (such as, the acid phosphoric ester of N-hydroxyisopropyl cyclohexyl amine), etc.; which may be obtained, for example, by reacting a strong oxygen-containing polybasic inorganic acid (such as sulfuric acid, phosphoric acid, sulfur trioxide, chlorosulfonic acid, phosphorus oxychloride, etc.) with a saturated or unsaturated, open-chain or cyclic, aliphatic amine, mixed open-chain aliphatic-cycloaliphatic amine, or a mixed open-chain aliphatic-aromatic amine, and particularly one which contains from 2 to 8 carbon atoms in an uninterrupted carbon chain and at least 1 hydroxyl group or olefinic double bond or both, as well as substitution products thereof (such as, hydroxy derivatives of said amines, hydroxy alkyl ethers of said amines, etc.), or by the action of concentrated sulfuric acid upon hydroxy alkyl derivatives of aromatic amines and diamines (such as, N-hydroxyethyl aniline, N-di-hydroxyethyl) aninile, N-hydroxyethyl o-toluidine, N-hydroxyethyl N-benzyl aniline, N-hydroxyethyl alpha- or beta- naphthylamine, N-hydroxyethyl ortho-, meta- or para-diamines, N-hydroxyethyl aminophenols or aminonaphthols—cf. British Patent 181,750), etc.

Mixtures of said salts of said acid alkyl esters may also be employed in accordance with the present invention, as for example the salts of suitable inorganic or organic bases with the commercially available and cheap mixtures of alkyl sulfuric acids resulting from the sulfuric acid treatment of gaseous and lighter liquid unsaturated hydrocarbons, such as the mixtures produced in the recovery and removal of unsaturated hydrocarbons in the production and purification of gasoline in the so-called "cracking" process of petroleum distillation.

The invention will be further described in connection with the following specific examples, which are given to illustrate the invention. It will be realized, however, that the invention is not limited thereto but that changes may be made in the materials treated and their proportions, manipulative steps, and other conditions without departing from the scope of the appended patent claims. The parts are by weight, unless otherwise indicated. Parts by volume are in the relation of liters to kilograms to the parts by weight.

*Example 1.*—300 parts of the sodium salt of Naphthol AS-D (the o-toluidide of 2,3-hydroxy-naphthoic acid) are dissolved in 3,000 parts of water with the aid of heat; 50 parts of isobutyl sodium sulfate are added and the mixture is stirred until solution is complete; it is then evaporated to dryness, ground and screened. A very readily dispersible yellow powder is thus obtained which is particularly adaptable for use in producing prints and developed dyeings.

Thus, the above yellow powder can be dissolved in caustic soda and water at a concentration of, for instance, 0.6 per cent, and a cotton fabric padded therewith and dried, preferably at low temperature; a printing paste comprising a stable diazo salt, a nitrosamine alkali metal salt, or an amine stabilized diazo compound can then be printed thereon; and the dye can be fully developed by a passage either through a weakly acid solution or through a rapid ager (vat or acid), the goods being thereupon rinsed, soaped and dried. The presence of the alkyl sulfate salt enhances the penetration, brilliancy and strength, giving very satisfactory results.

Other arylides of 2,3-hydroxy-naphthoic acid, as well as other suitable coupling components or developers may similarly be produced in advantageous powder form in accordance with the present invention, as for example naphthols, naphtholates, methyl-phenyl-pyrazolones, various arylides of aceto-acetic and other acylaceto carboxylic acids, various arylides of 2,3-hydroxy-carboxylic acid derivatives of anthracene, anthraquinones, carbazoles, etc., 2,4-dihydroxy-quinolines, and the like. Moreover, any of the other alkyl ester salts herein disclosed may be employed in a similar manner.

*Example 2.*—6 parts of the ortho-toluidide of 2,3-hydroxynaphthoic acid, to which 10 parts by volume of denatured alcohol may be added to facilitate wetting, are dissolved in 12 parts by volume of a 40° Bé. caustic soda solultion to which approximately 20 parts of water have been added and when the arylide is completely dissolved, 50 parts of normal-amyl sodium sulfate are added thereto and the solution is diluted to a total volume of 1000 parts.

A rayon fabric is padded therewith in a padding machine adjusted so that the cloth retains about 100 per cent of its weight of the solution, thereupon dried, preferably at low temperature such as in a flue at 60° C., and the material is then printed in the usual manner; e. g., with a fast diazo salt or a nitrosamine alkali metal salt as in the foregoing example, and then subjected to the usual finishing procedures.

*Example 3.*—60 parts of an equivalent mixture of the sodium nitrosamine of 2,5-dichlor-aniline and the sodium salt of the o-toluidide of 2,3-hydroxy-naphthoic acid are dissolved in 300 parts of cold water, to which an additional solvent such as ethyl alcohol or the ethyl-ether of glycol may be added; and 40 parts of isobutyl sodium sulfate are added and stirred until solution is complete. (The solution may be heated to a temperature of 40° to 50° C. but this is not essential.) Then 50 parts of a neutral 15 per cent sodium chromate solution are added and the mixture is thickened up with 550 parts of a neutral or alkaline starch-tragacanth thickening paste.

Textile material is printed with the above paste, dried and the color is developed directly in a hot 1 per cent acetic acid bath containing 2.5 per cent of $Na_2SO_4$ (formic acid may also be added) or the goods may be passed through an ager, whereupon the above acidic treatment may be applied; or the goods may be after-treated directly by a passage in an acetic acid or carbon dioxide ager, which causes full development; then rinsed, soaped, dried and finished. A very well penetrated, very bright scarlet print is thus obtained.

The isobutyl sodium sulfate may be replaced by any other alkyl ester salt herein described and may be added either as illustrated in Example 3 or may be added by thoroughly mixing in the dry state a dry mixture of the sodium nitrosamine of 2,5-dichlor-aniline and the sodium salt of the toluidide of 2,3-hydroxy-naphthoic acid before the mixture is dissolved and in the above proportions or in any other proportions. In the latter case the mixing may be effected in a ball mill, with nickel balls for example, and a finely ground material thus obtained. In order to get good results, at least 10 per cent of the alkyl ester salt based on the total weight of the nitrosamine-coupling component mixture should be added.

A similar procedure may be followed with any of the nitrosamine printing compositions obtained in accordance with the disclosure of U. S. P. 2,048,745, and in particular, with the compounds obtained according to Examples 1 to 7 of said patent, either by dry mixing the compositions obtained according to the above examples with from 5 to 30 per cent by weight of the composition of the alkali metal salt of the acid alkyl ester or by adding the alkyl ester salt to a printing paste or dyeing solution made therewith.

In every case a better penetration and greater brilliancy will be observed when compared with the shades obtained with the compositions of subject examples but where the alkyl ester salts have been omitted.

*Example 4.*—800 parts of the dry product obtained by vacuum drying an aqueous homogeneous mixture of equivalent amounts of the sodium salt of the nitrosamine of dianisidine and the sodium salt of the o-toluidide of 2,3-hydroxy-naphthoic acid, are charged into a mixer to which 200 parts of dry sodium isobutyl sulfate are added. The mixture is ground, by means of nickel balls for example, and thoroughly screened. A fine yellow power is obtained, which, when dissolved in the usual solvents and water and thickened up with an alkaline starch-tragacanth paste, yields a very smooth printing paste, which, when applied to any textile fiber, yields a very intense blue print of remarkable fastness.

In the above example the mixture of dianisidine nitrosamine and toluidide of 2,3-hydroxy sodium napthoate may be replaced by a mixture of the potassium salt of the nitrosamine of meta-chlor-toluidine and the o-toluidide of 2,3-hydroxy sodium naphthoate or any other nitros-amine-coupling component mixture.

The proportions of isobutyl sulfate employed may be varied widely; for example, from 10 to 40 per cent by weight of the standardized product. The more isobutyl sulfate is incorporated into the mixture, the better the results. On the average an amount equal to about 20 per cent of the weight of the standardized product yields excellent results.

Instead of the isobutyl sulfate employed in the above example, an equivalent amount of any of the alkyl sulfates herein disclosed (in the form of their alkali metal salts) or any of the other alkyl ester salts herein disclosed (preferably in the form of the alkali metal salt) or a mixture of two or more thereof may be employed.

Example 5.—434 parts of the diazo amino compound obtainable by combining the diazonium chloride of 2,5-dichloraniline with the sodium salt of 4-sulfo-2-amino-benzoic acid, are intimately mixed with 350 parts of the powder obtained in accordance with Example 1, and 216 parts of soluble dextrine. The resulting product may be directly incorporated into a printing composition and produces prints of excellent brightness and evenness.

Example 6.—200 parts of the diazoimino compound obtained by combining the diazonium salt of meta-chlor-toluidine with dimethyl amine, are dissolved in 2,000 parts of ethyl alcohol. After solution is complete, 300 parts of the sodium salt of Naphthol AS-D (the o-toluidide of 2,3-hydroxy-naphthoic acid) and 500 parts of isobutyl sodium sulfate are added; the mixture is evaporated to dryness, ground and screened. A readily dispersible yellow powder is thus obtained which yields a good printing composition. When incorporated into a printing paste of the type usually employed in connection with such mixtures, printed on a textile fabric, and subjected to an acid after-treatment, very bright red prints of excellent quality are obtained.

Mixtures of other suitable stabilized forms of diazo compounds and other suitable developers (as for example those of the type hereinbefore referred to) may be prepared in a manner similar to that described in Examples 5 and 6. Similarly, others of the alkyl ester salts herein disclosed may be employed.

Example 7.—450 parts of a filter cake of the sodium salt of meta-chlor-toluene-diazo-methyl-amino-acetic acid, obtained by salting out the diazoimino reaction product of the diazonium compound of meta-chlor-para-toluidine with sarcosine (methyl glycine), and containing approximately 31.4 per cent of the equivalent of the chlortoluidine and about 38 per cent of water and the usual impurities, are intimately mixed with 300 parts of the sodium salt of Naphthol AS-D and 100 parts of isobutyl sodium sulfate. The resulting paste is brought to dryness by intimate admixture with 150 parts of anhydrous trisodium phosphate. Upon grinding the dry mass and screening through a screen of fine mesh, a readily dispersible powder is obtained which can be added directly to a starch-tragacanth printing paste without being previously dissolved in water or other solvents. The resulting printing pastes, when printed on a textile fabric and subjected to an acid after-treatment in accordance with the usual procedure, produce prints of excellent quality.

In a similar manner, concentrated mixtures of the following azo dye-forming intermediates can be produced in the form of finely ground yellow powders which are readily soluble in water and other media employed in dyeing therewith and yielding the highly advantageous results similar to those of the above examples, by mixing equivalent proportions of the following stabilized diazo compounds and developers in the dry form with the soluble salts of the acid alkyl esters herein disclosed, and especially the alkali metal salts of said esters. The mixing may advantageously be carried out in connection with the standardization (mixing and grinding) of the stabilized form of diazo compound and developer:

| Diazo compound | Developer |
|---|---|
| Sodium salt of nitrosamine of p-nitro-o-anisidine | Naphthol AS. |
| Sodium salt of nitrosamine of p-nitraniline | Do. |
| Sodium salt of nitrosamine of dianisidine | Naphthol AS-D. |
| Sodium salt of nitrosamine of tetramethoxy-benzidine | Do. |
| Sodium salt of nitrosamine of m-nitro-p-toluidine | Naphthol AS. |
| Potassium salt of nitrosamine of m-nitro-p-toluidine | Naphthol AS-D. |
| Sodium salt of nitrosamine of p-chloro-o-nitraniline | Naphthol AS. |

It will be realized by those skilled in the art that the developers disclosed in the above examples may be replaced by any of the other developers herein disclosed and that said developers may be in the form of the salt (e. g., the alkali metal salt) or in the free form.

The diazo compounds in stabilized form include the various forms of such products, as for example the aromatic nitrosamines (diazotates), and the stabilized derivatives thereof set forth and claimed in my U. S. P. 2,048,745 and application Serial No. 688,194, filed September 5, 1933; amine-stabilized diazo compounds, such as diazoamino, diazoimino and related products; stable diazo salts, such as double salts of diazonium halides and metal halides (e. g., zinc chloride, cadmium chloride and related metal halide double salts), diazonium compounds stabilized by organic salts, such as naphthalene sulfonic acids, and the like; etc.

This application is a continuation-in-part of my applications Serial Nos. 673,031, filed May 26, 1933, now U. S. P. 2,145,193, and 688,194, filed September 5, 1933.

I claim:

1. A composition of matter comprising an intermediate adapted to form an insoluble azo dye by a coupling reaction and a soluble salt of a non-foaming acid alkyl ester of an inorganic polybasic acid, said acid alkyl ester consisting, on the one hand, of a radical of an inorganic polybasic acid in which at least one of the replaceable hydrogen atoms is present, and, on the other hand, of one or more organic radicals directly linked to the inorganic radical, said organic radicals being free from open-chain hydrocarbon radicals containing more than 8 carbon atoms.

2. A composition of matter in the dry solid form comprising an intermediate adapted to form an insoluble azo dye by a coupling reaction and a soluble salt of a non-foaming acid alkyl ester of an inorganic polybasic acid, said acid alkyl ester consisting, on the one hand, of a radical of an inorganic polybasic acid in which at least one of the replaceable hydrogen atoms is present, and, on the other hand, of one or more organic radicals directly linked to the inorganic radical, said organic radicals being free from open-chain hydrocarbon radicals containing more than 8 carbon atoms.

3. A composition of matter comprising an intermediate adapted to form an insoluble azo dye by a coupling reaction and a soluble salt of an acid alkyl ester of an inorganic polybasic acid, said acid alkyl ester consisting, on the one hand, of a radical of an inorganic polybasic acid in which at least one of the replaceable hydrogen atoms is present, and, on the other hand, of one or more organic radicals directly linked to the inorganic radical, said organic radicals being free from open-chain hydrocarbon radicals containing more than 5 carbon atoms.

4. A composition of matter in the dry solid form comprising an intermediate adapted to form an insoluble azo dye by a coupling reaction and an alkali metal salt of an acid alkyl ester of an inorganic polybasic acid, said acid alkyl ester consisting, on the one hand, of a radical of an inorganic polybasic acid in which at least one of the replaceable hydrogen atoms is present, and, on the other hand, of one or more organic radicals directly linked to the inorganic radical, said organic radicals being free from open-chain hydrocarbon radicals containing more than 5 carbon atoms.

5. A composition of matter comprising a developer for diazo compounds adapted to produce azo dyes and a soluble salt of a non-foaming acid alkyl ester of an inorganic polybasic acid, said acid alkyl ester consisting, on the one hand, of a radical of an inorganic polybasic acid in which at least one of the replaceable hydrogen atoms is present, and, on the other hand, of one or more organic radicals directly linked to the inorganic radical, said organic radicals being free from open-chain hydrocarbon radicals containing more than 8 carbon atoms.

6. A composition of matter comprising a developer for diazo compounds adapted to produce azo dyes and an alkali metal salt of a non-foaming acid alkyl ester of an inorganic polybasic acid, said acid alkyl ester consisting, on the one hand, of a radical of an inorganic polybasic acid selected from the group consisting of sulfuric and phosphoric acids, in which at least one of the replaceable hydrogen atoms is present, and, on the other hand, of one or more organic radicals directly linked to the inorganic radical, said organic radicals being free from open-chain hydrocarbon radicals containing more than 5 carbon atoms.

7. A composition of matter in the dry solid form comprising an arylide developer for diazo compounds adapted to produce azo dyes and an alkali metal salt of a non-foaming acid alkyl ester of an inorganic polybasic acid, said acid alkyl ester consisting, on the one hand, of a radical of an inorganic polybasic acid in which at least one of the replaceable hydrogen atoms is present, and, on the other hand, of one or more organic radicals directly linked to the inorganic radical, said organic radicals being free from open-chain hydrocarbon radicals containing more than 8 carbon atoms.

8. A composition of matter in the form of a powder comprising an arylide of 2,3-hydroxynaphthoic acid, and an alkali metal salt of a monoalkyl sulfuric acid, in which the alkyl group contains from 3 to 5 carbon atoms.

9. A composition of matter in the form of a powder comprising an arylide of aceto-acetic acid, and an alkali metal salt of a monoalkyl sulfuric acid, in which the alkyl group contains from 3 to 5 carbon atoms.

10. A composition of matter comprising a developer for diazo compounds, a stabilized form of diazotized aromatic amine, and a soluble salt of a non-foaming acid alkyl ester of an inorganic polybasic acid, said acid alkyl ester consisting, on the one hand, of a radical of an inorganic polybasic acid in which at least one of the replaceable hydrogen atoms is present, and, on the other hand, of one or more organic radicals directly linked to the inorganic radical, said organic radicals being free from open-chain hydrocarbon radicals containing more than 8 carbon atoms.

11. A composition of matter comprising an arylide developer for diazo compounds, a stabilized form of diazo compound, and a soluble salt of a non-foaming acid alkyl ester of an inorganic polybasic acid, said acid alkyl ester consisting, on the one hand, of a radical of an inorganic polybasic acid in which at least one of the replaceable hydrogen atoms is present, and, on the other hand, of one or more organic radicals directly linked to the inorganic radical, said organic radicals being free from open-chain hydrocarbon radicals containing more than 8 carbon atoms.

12. A composition of matter comprising a developer for diazo compounds adapted to produce azo dyes, a stabilized form of a diazo compound, and a soluble salt of an acid alkyl ester of an inorganic polybasic acid, said acid alkyl ester consisting, on the one hand, of a radical of an inorganic polybasic acid selected from the group consisting of sulfuric and phosphoric acids, in which at least one of the replaceable hydrogen atoms is present, and on the other hand, of one or more organic radicals directly linked to the inorganic radical, said organic radicals being free from open-chain hydrocarbon radicals containing more than 5 carbon atoms.

13. A composition of matter in the form of a powder comprising an arylide developer for diazo compounds adapted to produce azo dyes, an amine-stabilized form of diazo-compound, and a soluble salt of an acid alkyl ester, said acid alkyl ester consisting, on the one hand, of a radical of an inorganic polybasic acid in which at least one of the replaceable hydrogen atoms is present, and, on the other hand, of one or more organic radicals directly linked to the inorganic radical, said organic radicals being free from open-chain hydrocarbon radicals containing more than 8 carbon atoms.

14. A composition of matter in the dry solid form comprising an arylide developer, a stabilized form of diazo compound, and an alkali metal salt of an acid alkyl ester of an inorganic polybasic acid, said acid alkyl ester consisting, on the one hand, of a radical of an inorganic polybasic acid selected from the group consisting of sulfuric and phosphoric acids, in which at least one of the replaceable hydrogen atoms is present, and on the other hand, of one or more organic radicals directly linked to the inorganic radical, said organic radicals being free from open-chain hydrocarbon radicals containing more than 5 carbon atoms.

15. A composition of matter in the form of a powder comprising an arylide of 2,3-hydroxynaphthoic acid, an amine-stabilized form of diazo compound, and an alkali metal salt of a monoalkyl sulfuric acid, in which the alkyl group contains from 3 to 5 carbon atoms.

16. A composition of matter in the form of a powder comprising an arylide of aceto-acetic acid, an amine-stabilized form of diazo compound, and an alkali metal salt of a monoalkyl sulfuric acid, in which the alkyl group contains from 3 to 5 carbon atoms.

17. A method of making a composition for dyeing and printing textile fibers with insoluble azo dyes by a coupling reaction of azo dye-forming intermediates in the presence of the fiber, which comprises mixing with one of said intermediates in an aqueous medium a soluble salt of a non-foaming acid alkyl ester of an inorganic polybasic acid, said acid alkyl ester consisting, on the one hand, of a radical of an inorganic polybasic acid in which at least one of the replaceable hydrogen atoms is present, and, on the other hand, of one or more organic radicals directly linked to the inorganic radical, said organic radicals being free from open-chain hydrocarbon radicals containing more than 8 carbon atoms.

18. In the art of dyeing and printing textile fibers with water-insoluble azo dyes by a coupling reaction of azo dye-forming intermediates in the presence of the fiber, the improvement which comprises carrying out the dyeing and printing in the presence of a salt of a non-foaming acid alkyl ester of an inorganic polybasic acid, said acid alkyl ester consisting, on the one hand, of a radical of an inorganic polybasic acid in which at least one of the replaceable hydrogen atoms is present, and, on the other hand, of one or more organic radicals directly linked to the inorganic radical, said organic radicals being free from open-chain hydrocarbon radicals containing more than 8 carbon atoms.

JEAN G. KERN.